(12) United States Patent
Schelhorn

(10) Patent No.: US 12,528,576 B2
(45) Date of Patent: Jan. 20, 2026

(54) AVIATION SPEED BRAKE ASSEMBLY ACTUATED BY A PNEUMATICACTUATOR

(71) Applicant: Timothy J. Schelhorn, Nampa, ID (US)

(72) Inventor: Timothy J. Schelhorn, Nampa, ID (US)

(*) Notice: Subject to any disclaimer, the term of this patent is extended or adjusted under 35 U.S.C. 154(b) by 0 days.

(21) Appl. No.: 18/807,977

(22) Filed: Aug. 18, 2024

(65) Prior Publication Data

US 2025/0058868 A1 Feb. 20, 2025

Related U.S. Application Data

(60) Provisional application No. 63/533,611, filed on Aug. 18, 2023.

(51) Int. Cl.
*B64C 9/32* (2006.01)
*B64C 9/02* (2006.01)
*B64C 9/08* (2006.01)

(52) U.S. Cl.
CPC ............... *B64C 9/326* (2013.01); *B64C 9/02* (2013.01); *B64C 9/08* (2013.01)

(58) Field of Classification Search
CPC .. B64C 9/32; B64C 9/326; B64C 9/02; B64C 9/08
See application file for complete search history.

(56) References Cited

U.S. PATENT DOCUMENTS

| | | | | |
|---|---|---|---|---|
| 2,698,149 A | * | 12/1954 | Greenwood | B64C 9/36 244/113 |
| 2,768,801 A | * | 10/1956 | Bitner | B64C 9/34 244/90 A |
| 4,046,338 A | * | 9/1977 | Kline | B64C 3/38 244/213 |
| 2017/0369190 A1 | * | 12/2017 | Ethington | B64F 5/60 |
| 2019/0135426 A1 | * | 5/2019 | Bailie | B64D 5/00 |
| 2020/0062376 A1 | * | 2/2020 | West | F02K 1/00 |
| 2020/0086550 A1 | * | 3/2020 | Smith | B29C 66/7422 |

FOREIGN PATENT DOCUMENTS

| | | | | |
|---|---|---|---|---|
| GB | 445270 A | * | 4/1936 | B09B 3/00 |
| WO | WO-2007117260 A2 | * | 10/2007 | B64C 25/16 |

* cited by examiner

*Primary Examiner* — Joshua D Huson
*Assistant Examiner* — Anna L. Gordon
(74) *Attorney, Agent, or Firm* — Charles R. Clark

(57) ABSTRACT

An aviation speed brake assembly having a fuselage-conformal belly-mounted aviation speed brake panel and having a pilot controlled speed brake pneumatic actuator that a pilot may choose to energize to extend and to de-energize to retract said speed brake panel. The invention is particularly useful in effecting a modification of a preexisting experimental light sport aircraft that results in a more capable aircraft with improved low speed flight characteristics and improved airspeed deceleration capability.

7 Claims, 14 Drawing Sheets

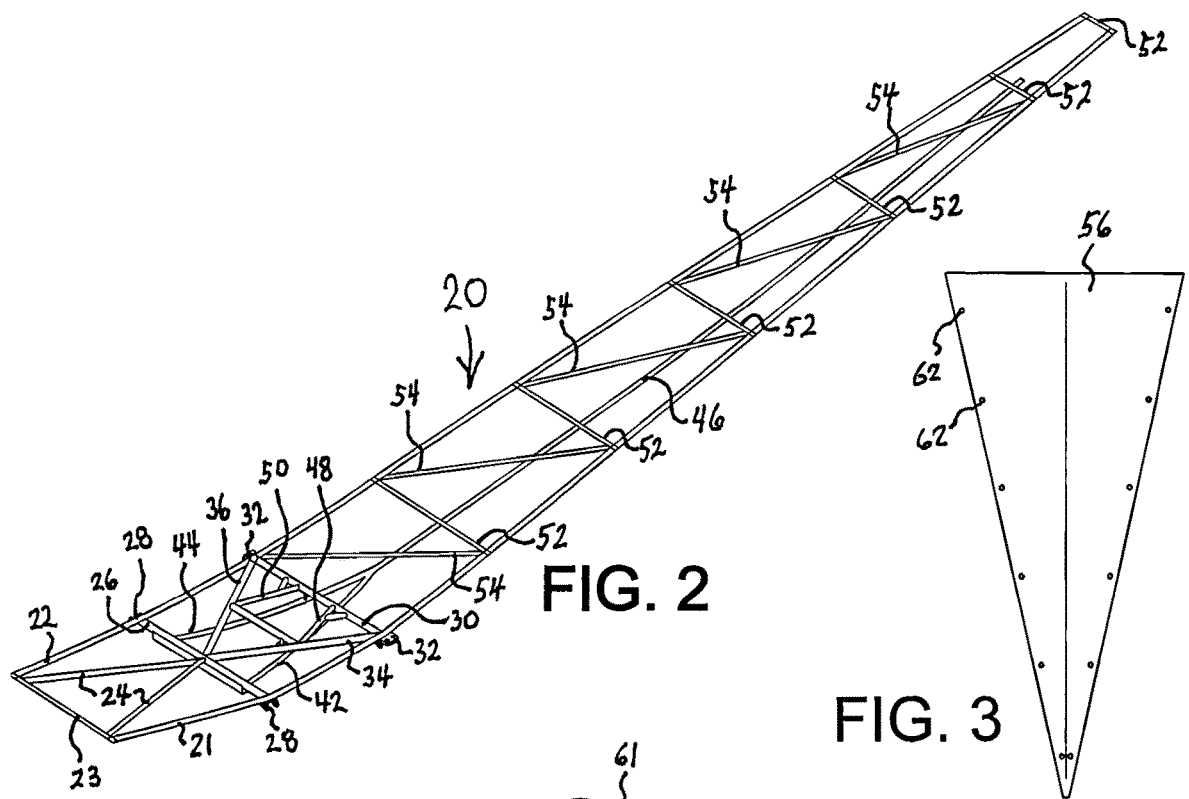
FIG. 2
FIG. 3
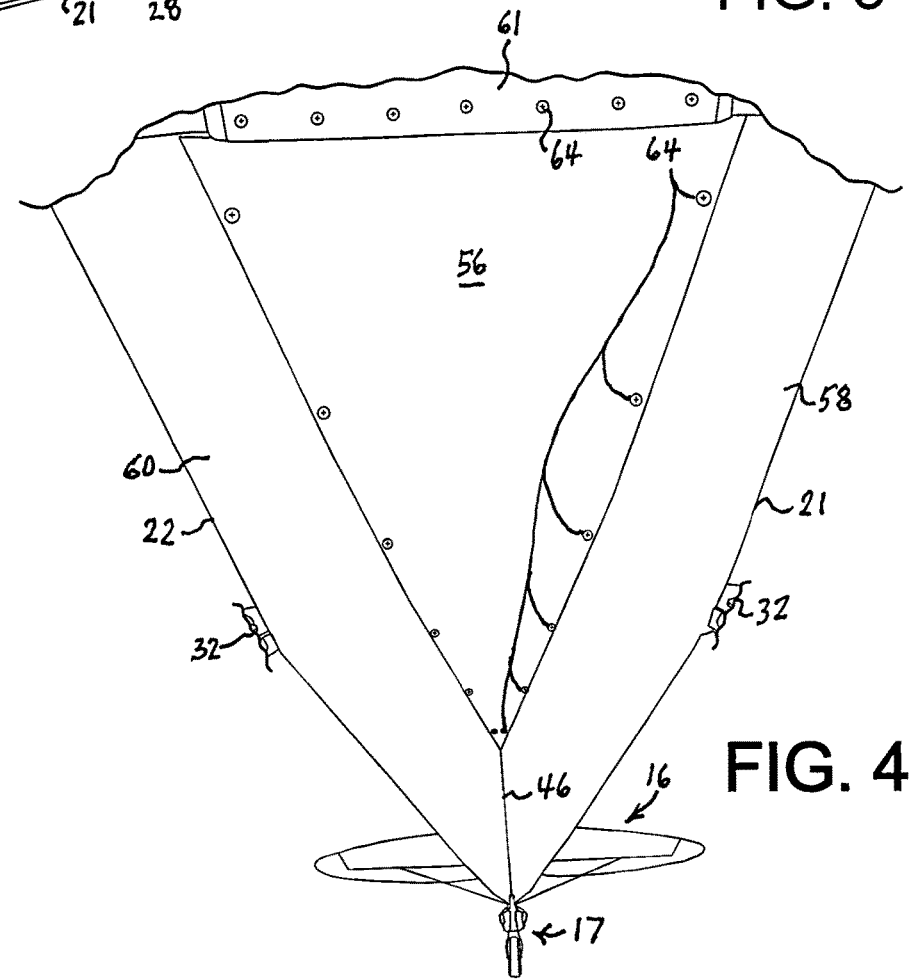
FIG. 4

AVIATION SPEED BRAKE ASSEMBLY ACTUATED BY A PNEUMATIC ACTUATOR

CROSS-REFERENCE TO RELATED APPLICATIONS

This application claims the benefit of U.S. Provisional Application No. 63/533,611, filed Aug. 18, 2023.

STATEMENT

Statement Regarding Federally Sponsored Research or Development

Not Applicable

REFERENCE TO A SEQUENCE LISTING

Not Applicable

BRIEF SUMMARY OF THE INVENTION

The present invention relates to a novel aviation speed brake assembly having a fuselage-conformal belly-mounted aviation speed brake panel 90, 100 and having a pilot controlled speed brake pneumatic actuator 76 that a pilot may choose to energize to extend and to de-energize to retract said speed brake panel. The invention is particularly useful in effecting a modification of a preexisting experimental light sport aircraft such as a Carbon Cub EX-2 model aircraft 8 that results in a more capable aircraft 208 with improved low speed flight characteristics and improved airspeed deceleration capability.

The present invention is an aviation speed brake assembly operatively mounted to a lower fuselage frame 20 and interior portions of an aircraft 8 that provides a forward-hinged fuselage-conformal belly-mounted aviation speed brake panel 90, 100 as a key component and incorporates a pneumatic actuator 76 that when during forward flight is selectively energized by the pilot quickly and fully extends said panel against the oncoming airstream to decelerate said aircraft and when said actuator is de-energized said panel is retracted by one or more panel retracting tension springs 120 and preferably assisted by an internal retraction spring within said actuator. When retracted the panel is retained in conformal proximity to the belly of the fuselage by said tension springs and preferably by a panel securement magnet 104 located on the rearward centerline of the upper surface of said panel that magnetically attaches said panel to an overhead ferromagnetic portion of said lower fuselage frame. The invention is particularly appropriate for use when mounted to an experimental light sport single engine short takeoff and landing (STOL) capable aircraft to enhance pilot control during flight to quickly decelerate forward airspeed during use of said aircraft by a pilot in STOL Drag competitive events by facilitating enhanced pilot flight control to quickly decelerate said aircraft resulting in more competitive, desirable, improved, better, and shorter times for each competitive flight segment. The invention can be retrofitted to an appropriate existing light sport aircraft (including potentially candidate aircraft from Rans Aircraft, Kit Fox, Highlander, Bad Lands Cub, Legend Cub, Patriot Aircraft, Zlin Aircraft, and Javron) or could be incorporated in a new aircraft during its manufacture.

The invention an aviation speed brake assembly actuated by a pneumatic actuator enables a novel aircraft modification and enhanced airspeed deceleration and slow speed flight control of a light sport aircraft such a Carbon Cub EX-2 kit aircraft manufactured by Cub Crafters, Inc. of Yakima, Washington and likely could be effectively used with other Cub Crafters models and other experimental light sport single engine aircraft.

A principal objective of the speed brake assembly is to provide a novel aviation speed brake panel 90, 100 that incorporates a pneumatic actuator 76 that under pilot control selectively extends a conformal belly-mounted aviation speed brake panel that when said actuator is de-energized is retracted by one or more panel retracting tension springs 120 that is lightweight, compact, simple, low-maintenance, and reliable for use in a system that selectively provides the pilot with an aircraft having improved flight control characteristics.

Additional and various other objects and advantages attained by the invention will become more apparent as the specification is read and the accompanying figures are reviewed.

The aviation speed brake panel 90, 100 in its first and second embodiments preferably is selectively extended by one pneumatic actuator 76 and retracted by an internal actuator spring and one or two panel retracting tension springs 120. The actuator requires an operative hook-up of a pilot controlled charging tube 80 to said actuator. The charging tube 80 is selectively charged by a high pressure pneumatic actuator charging bottle 110 containing air, carbon dioxide, nitrogen, or another appropriate gaseous charging material. The selective control of the invention's actuator may be accomplished by a pilot using a manual control system that controls the charging and discharging of said charging tube.

The preferred embodiment uses a pneumatic actuator, but other appropriate devices including a hydraulic actuator, or an electrical linear actuator potentially could be used.

BRIEF DESCRIPTION OF THE SEVERAL VIEWS OF THE DRAWING

FIG. 2 is a partial, perspective view of the lower support frame assembly 20 of said prior art aircraft 8 shown in FIG. 1;

FIG. 3 is a top plan view of an acute isosceles triangular belly access panel 56;

FIG. 4 is a partial, bottom perspective view toward the rear of said aircraft 8 showing portions of said frame and said belly access panel;

DETAILED DESCRIPTION OF THE INVENTION

Figure 1:
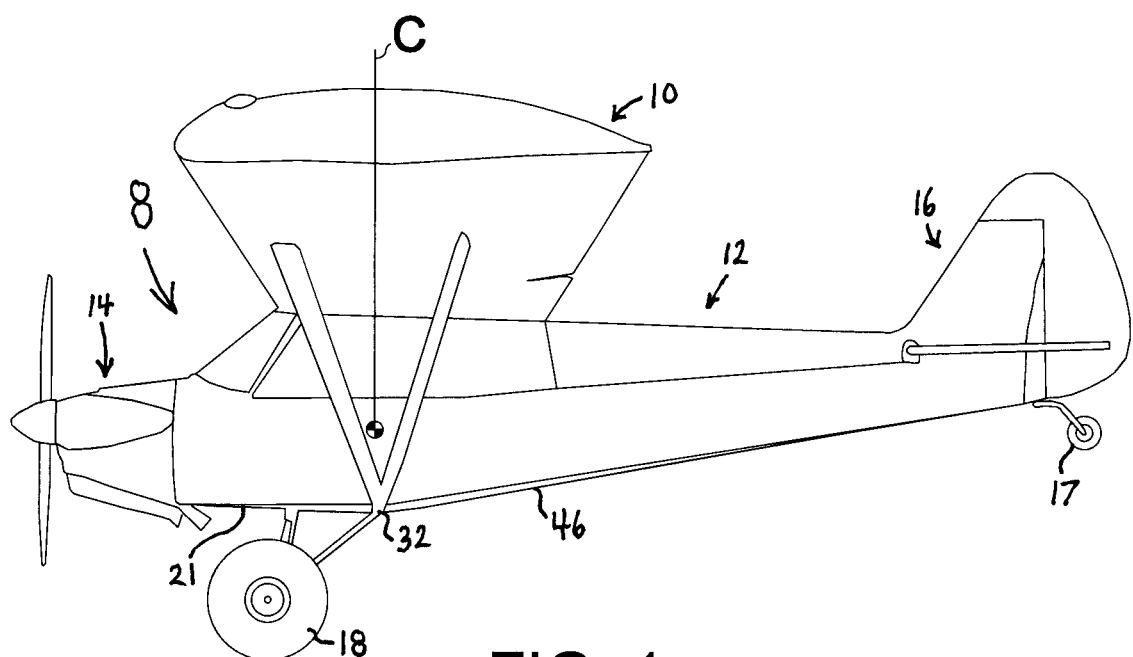
FIG. 1 is a side view of a prior art experimental single engine aircraft 8 that is an appropriate candidate aircraft for retrofitting with the instant invention and showing the longitudinal center of gravity C of said aircraft.
Figure 5:
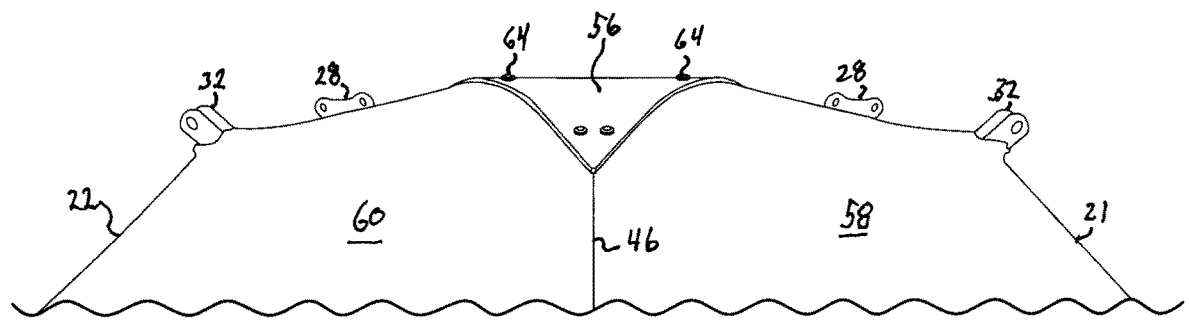
FIG. 5 is an upside down, partial, bottom perspective view from the rear of said aircraft shown in FIG. 1 showing a rearward outer portion of said belly access panel 56.

Referring to FIGS. 1 to 38, the present invention is a novel forward-hinged fuselage-conformal belly-mounted aviation speed brake assembly having a novel speed brake panel 90, that can be mounted to a prior art aircraft 8 resulting in a modified aircraft 208.

Referring to FIGS. 2 to 6, an illustrative prior art aircraft is a prior art tail dragger short takeoff and landing (STOL) capable aircraft 8 (single engine high wing aircraft) (e.g. Carbon Cub EX-2) that can be equipped with a forward-hinged fuselage-conformal belly-mounted aviation speed brake panel 90, 100; said prior art aircraft comprising:

a wing 10 connected to a fuselage 12; an engine 14 connected to said fuselage; said fuselage having an empennage 16, a tail wheel assembly 17, and a main landing gear assembly preferably having flotation tires 18;

said fuselage having a lower fuselage frame 20 comprising:

a lower fuselage longitudinal left main rail 21 and a corresponding lower fuselage longitudinal right main rail 22, said longitudinal main rails each joined at their respective front ends to respective outer ends of a bridging forward cross tube 23;

a pair of two converging rearward diagonal frame tubes 24 joined at their front ends to outer ends of said forward cross tube and joined together to a mid-portion of a bridging front main cross tube 26 attached between said main rails, said front main cross tube having a transverse attachment rail 27 attached along a mid-portion of said front main cross tube and having a pair of front main cross tube connector fittings 28 attached to outer end portions of said front main cross tube;

a bridging rear main cross tube 30 spaced from said front main cross tube and attached between said main rails and having a pair of spaced rear main cross tube connector fittings 32 attached to outer end portions of said rear main cross tube;

a pair of two forward converging diagonal frame tubes 34 and 36 joined together at their front ends and joined to a mid-portion of said front main cross tube 26 and bridging and connecting to outer end portions of said rear main cross tube 30;

an intermediate cross tube 38 bridging and attached between mid-portions of said forward converging diagonal frame tubes 34, 36;

a battery grounding stud 40 connected to said intermediate cross tube;

two downward bowed rearward converging access panel tubes 42 and 44 joined at their front ends to outward portions of said front main cross tube 26 and joined at their rear ends to a longitudinal centerline fuselage keel stringer tube 46;

two converging rearward diagonal truss tubes 48 and 50 attached respectively to outer end portions of said intermediate cross tube 38 and attached between said intermediate cross tube and said rear main cross tube 30 and said converging forward diagonal frame tubes 34 and 36, said diagonal truss tubes bracketing about the longitudinal centerline;

a plurality of transverse cross tubes 52 distributed rearward beyond said rear main cross tube 30 and bridging and attached between converging portions of said main rails and 22;

a plurality of diagonal cross tubes 54 distributed parallel to one another and rearward beyond said rear main cross tube 30 and bridging and attached between converging portions of said main rails 21 and 22 and preferably between adjacent said transverse cross tubes 52;

an acute isosceles triangular lower fuselage belly access panel 56 removably attached to said access panel tubes 42, 44;

a lower left fuselage outer skin surface 58 (shown in FIG. 4);

a lower right fuselage outer skin surface 60 (shown in FIG. 4);

an engine boot cowl having a rearward transverse edge and a plurality of cowl attachment apertures operatively spaced from and distributed along said transverse rearward edge (shown in FIG. 4); and reversibly attached by a plurality of threaded panel and cowl attachment connectors 64 respectively attached through said plurality of cowl attachment apertures to said transverse attachment rail 27.

Figure 6:
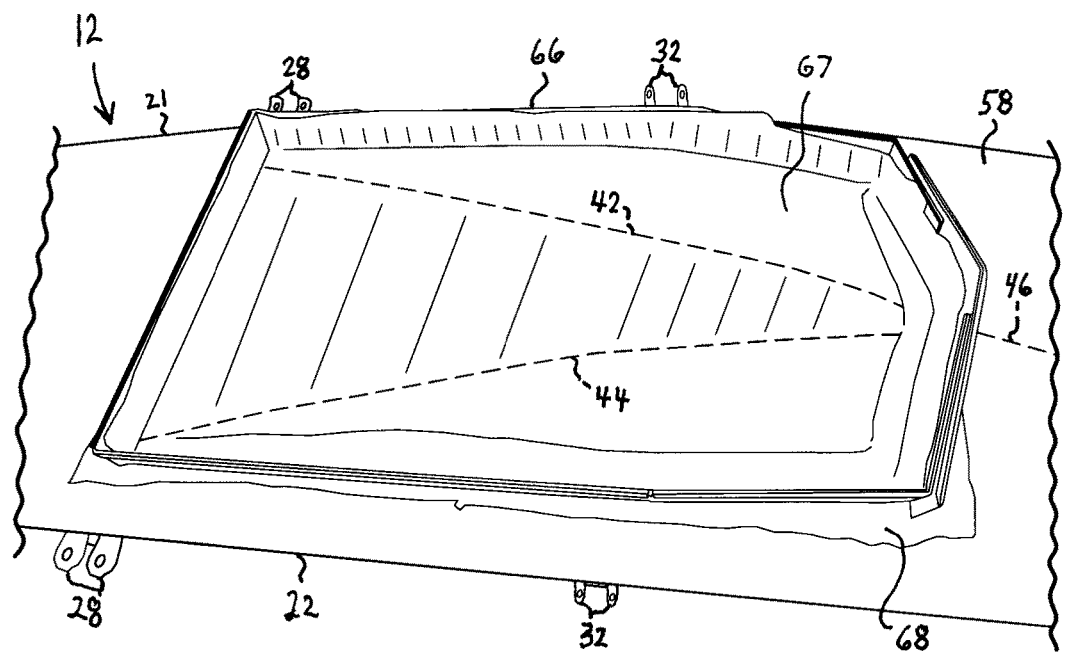
FIG. 6 is a partial, perspective view from above and from the right side of an upside down fuselage 12 being used during an illustrative early step of a multilayer carbon fiber reenforced polymer (CFRP) fuselage-conformal molding process of a forward-hinged fuselage-conformal belly-mounted aviation speed brake panel 90, 100 (a multilayer panel)
Figure 7:
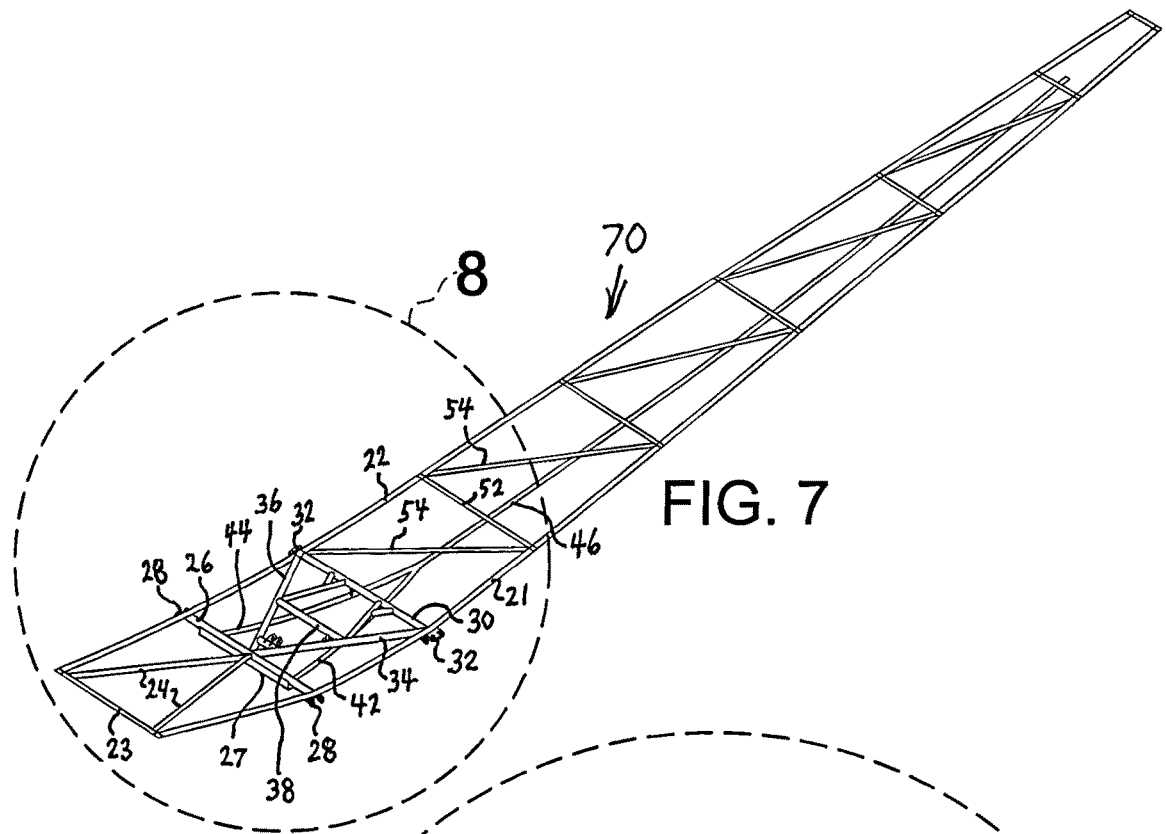
FIG. 7 is a partial, perspective view of a modified lower support frame assembly 70 of said prior art frame assemby 20 shown in FIG. 2.
Figure 8:
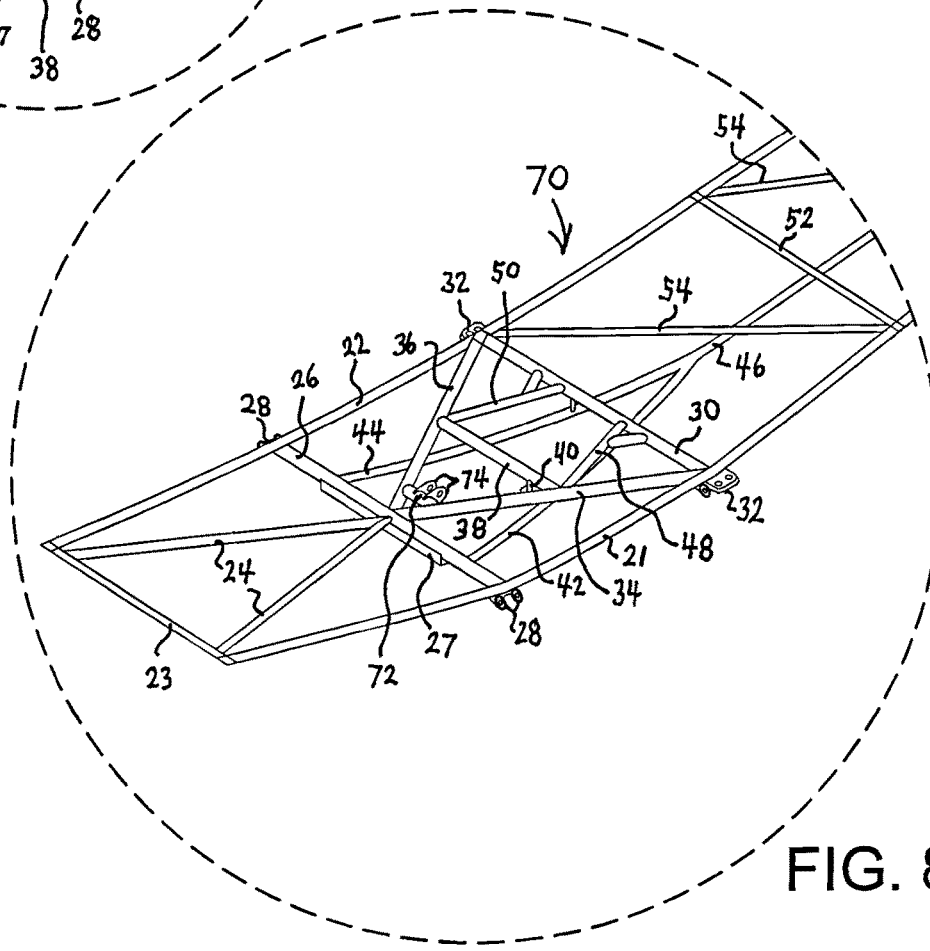
FIG. 8 is a view of the indicated portion of FIG. 7 showing an actuator attachment cross tube 72 and a pair of pneumatic actuator mounting ears 74.
Figure 9:
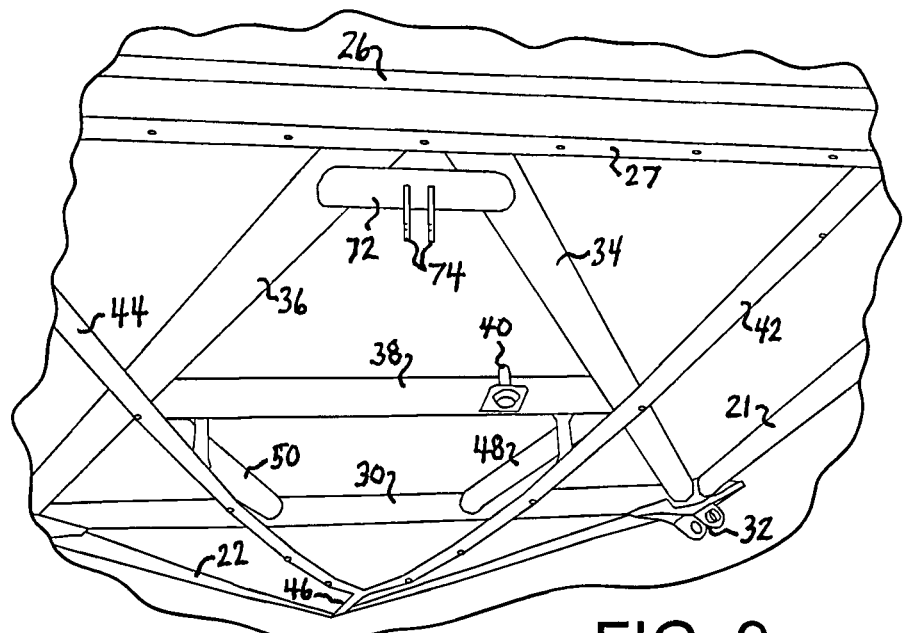
FIG. 9 is a partial, perspective view from below and forward towards the rear of said frame assembly 70 showing an actuator attachment cross tube 72 and a pair of pneumatic actuator mounting ears 74.
Figure 10:
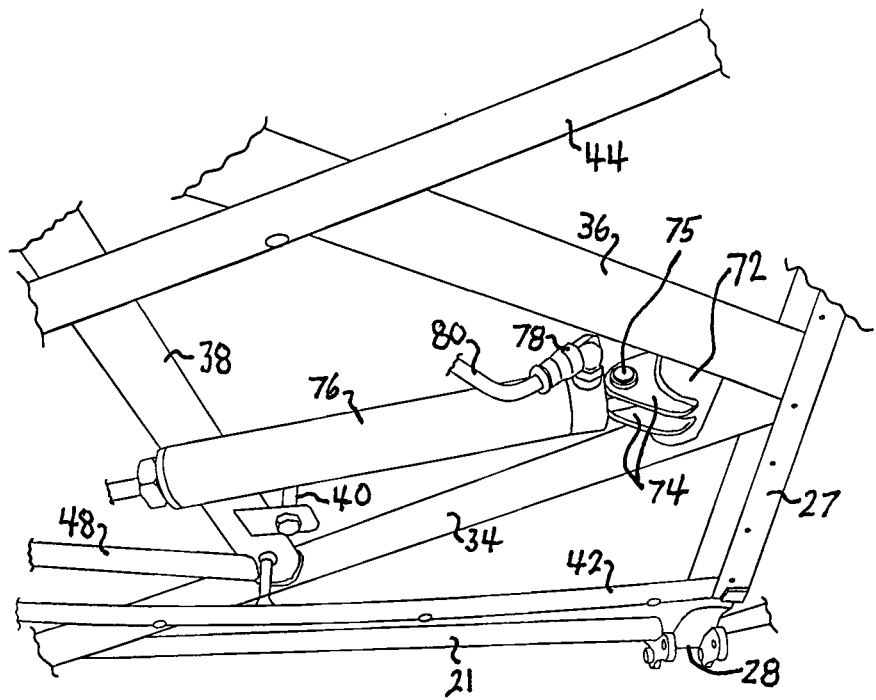
FIG. 10 is a partial, perspective upward and from the side view of said frame assembly showing a pneumatic actuator 76 operatively attached to said ears and showing an actuator charging tube quick connector 78 that connects a charging tube 80 to said actuator, said actuator also to be later operatively attached to and between two actuator mounting rails 92.
Figure 11:
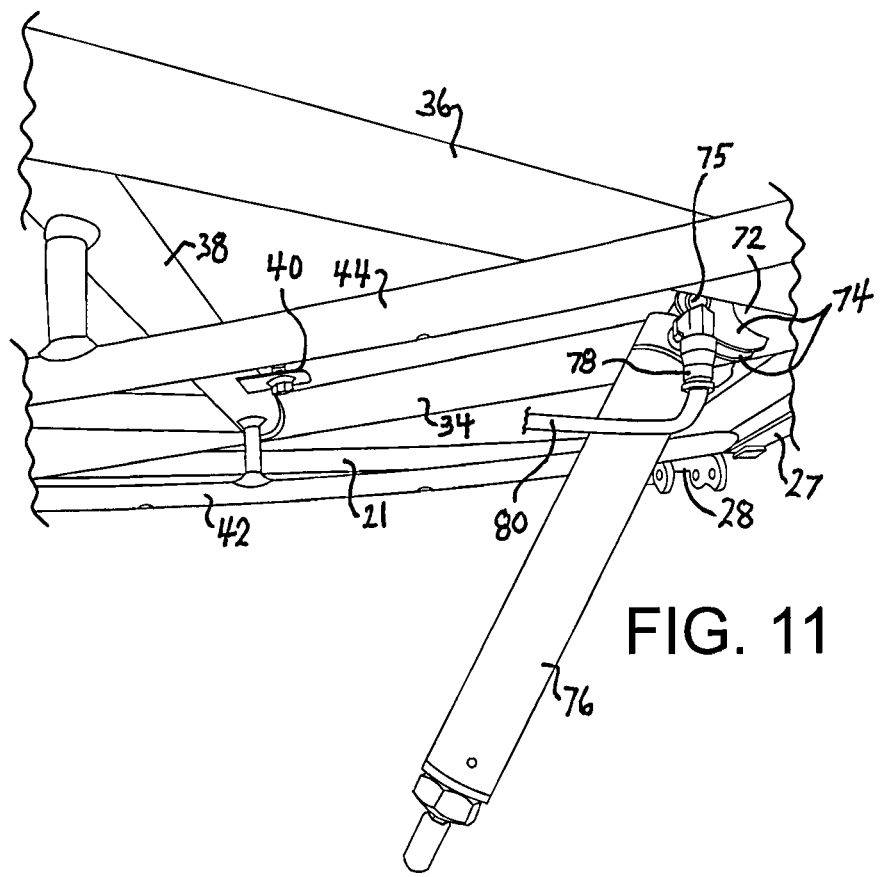
FIG. 11 is a partial, perspective side view and from below of said frame assembly 70.
Figure 12:
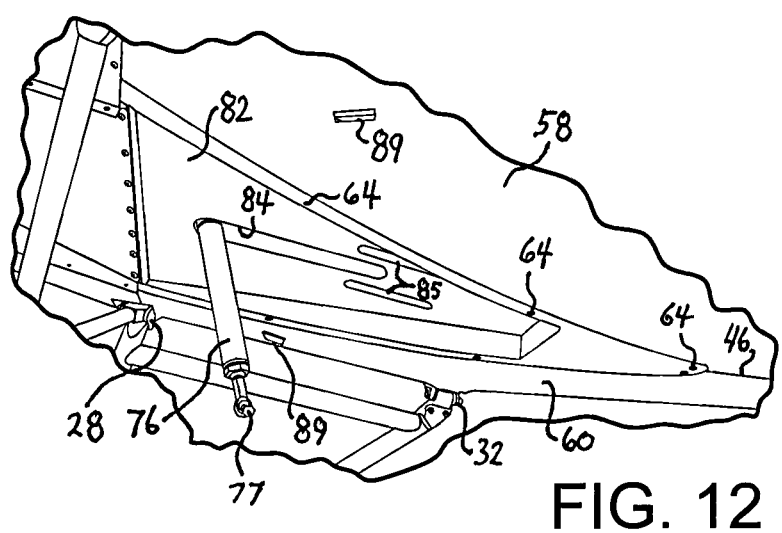
FIG. 12 is a partial, perspective side view from below showing a recessed intermediate shielding panel 82.
Figure 13:
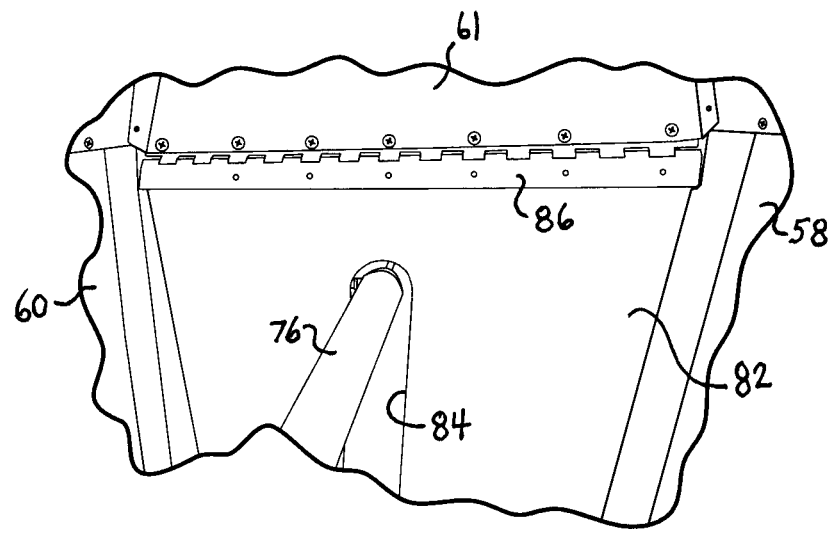
FIG. 13 is a partial, perspective view from below said aircraft showing a panel hinge 86.
Figure 14:
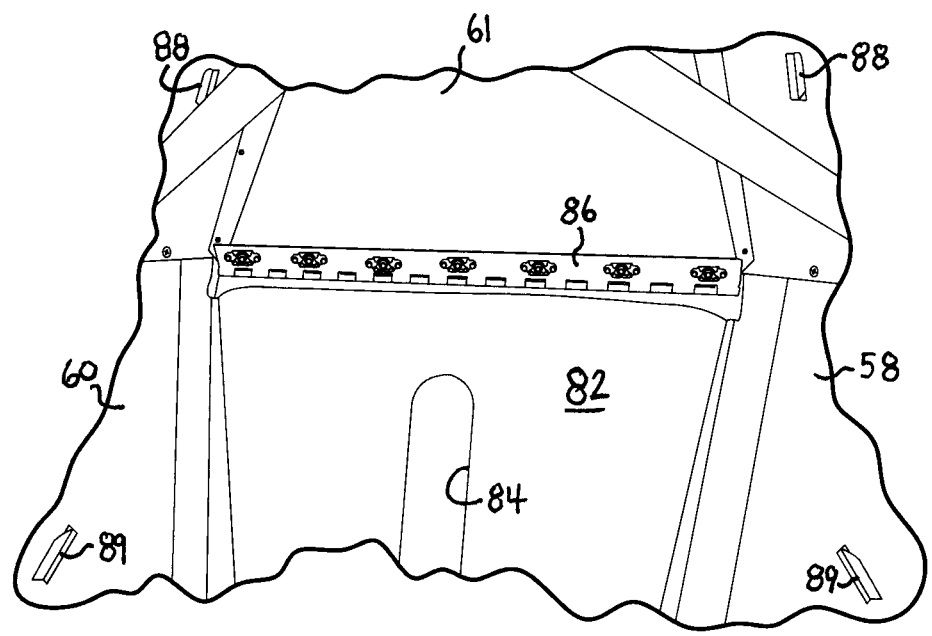
FIG. 14 is a partial, perspective view from below showing the inner side of the rearward half of said panel hinge 86 having a plurality of threaded nuts distributed along the length of said hinge, an actuator slot 84, two spaced parallel vortex generators 88, and two spaced angled vortex generators 89 (each angled vortex generators angled towards the longitudinal centerline at an angle selected between 30 and 60 degrees)
Figure 15:
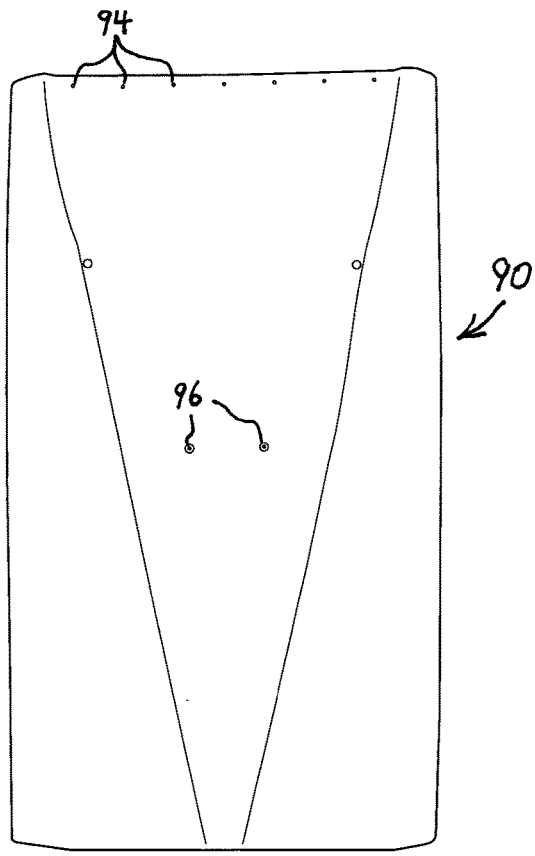
FIG. 15 is a top plan view of a first embodiment of a forward-hinged fuselage-conformal belly-mounted aviation speed brake panel 90.
Figure 16:
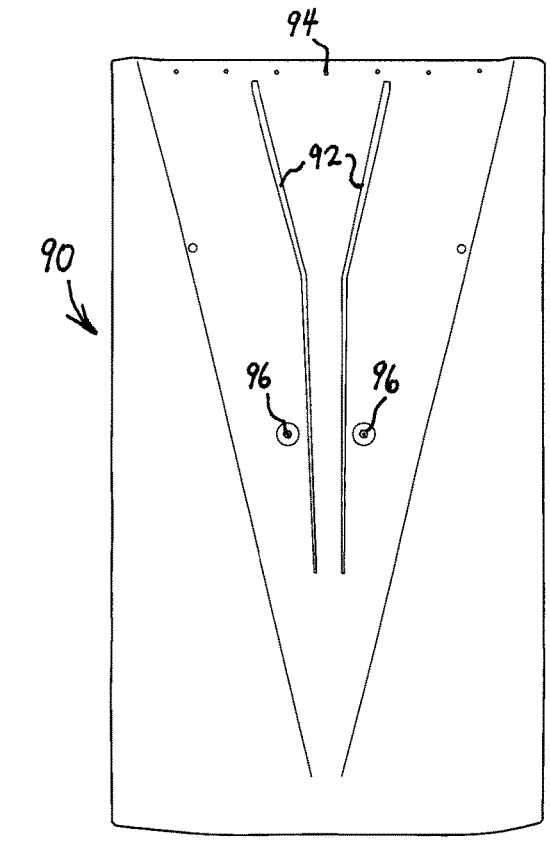
FIG. 16 is a bottom plan view of said first embodiment of said forward-hinged fuselage-conformal belly-mounted aviation speed brake panel 90.
Figure 17:
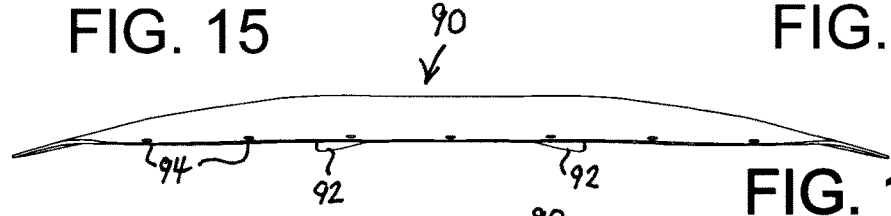
FIG. 17 is a leading edge view of said first embodiment of said forward-hinged fuselage-conformal belly-mounted aviation speed brake panel 90.
Figure 18:
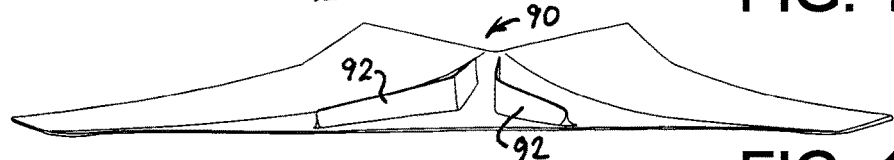
FIG. 18 is a perspective view from forward and above of said first embodiment of said forward-hinged fuselage-conformal belly-mounted aviation speed brake panel 90.
Figure 19:
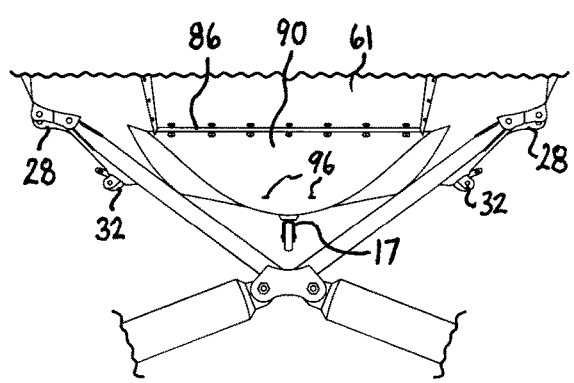
FIG. 19 is a perspective view of said first embodiment of said forward-hinged fuselage-conformal belly-mounted aviation speed brake panel 90 (retracted) in close proximity to lower portions of said aircraft.
Figure 20:
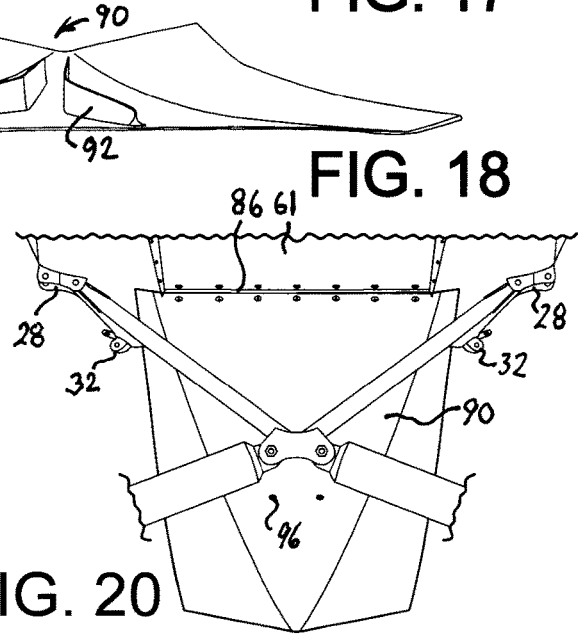
FIG. 20 is a perspective view of said first embodiment of said forward-hinged fuselage-conformal belly-mounted aviation speed brake panel 90 (extended)
Figure 21:
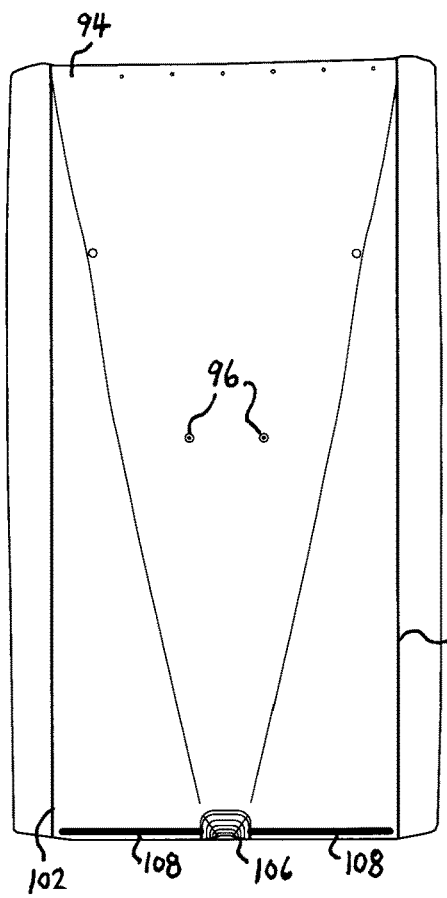
FIG. 21 is a top plan view of a second embodiment of a forward-hinged fuselage-conformal belly-mounted aviation speed brake panel 100 showing a pair of spaced parallel aerodynamic strakes 102, an aerodynamic ramp 106 attached to a centerline rear trailing edge outer surface portion of said panel located at an outer rear edge portion of said panel, and a pair of rearward wickerbill ridges 108 bracketing said ramp along said rear edge portion and extending outwardly below the main body of said panel and located between said strakes and respective sides of said ramp.
Figure 22:
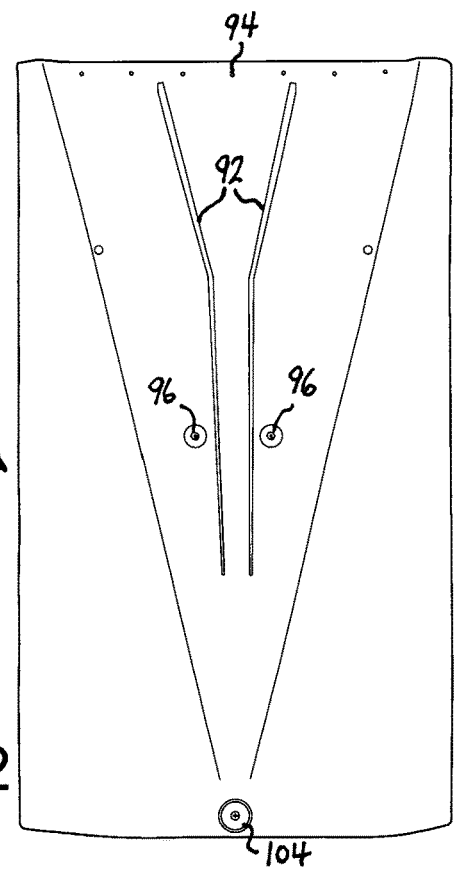
FIG. 22 is a bottom plan view of said second embodiment of said forward-hinged fuselage-conformal belly-mounted aviation speed brake panel 100, a centerline speed brake panel securement magnet 104 and two spaced speed brake panel pneumatic actuator mounting rails 92 attached to the inner surface of said panel bracketing the longitudinal centerline of said panel.
Figure 23:
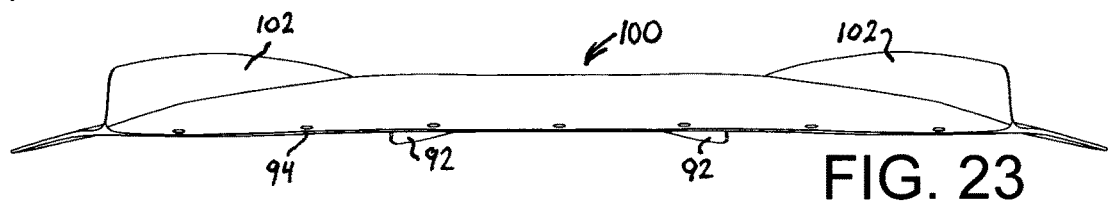
FIG. 23 is a leading edge view of said second embodiment of said forward-hinged fuselage-conformal belly-mounted aviation speed brake panel 100.
Figure 24:
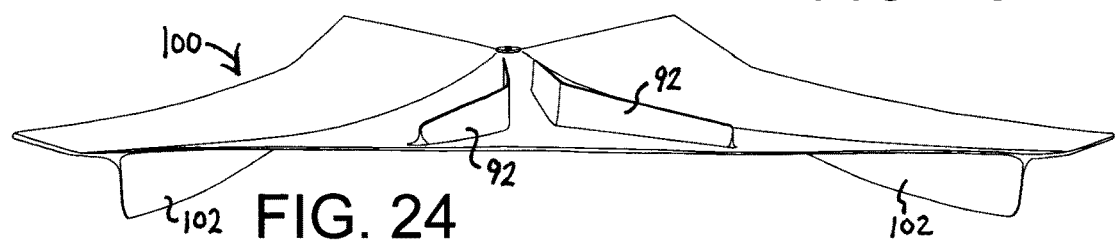
FIG. 24 is a perspective view from forward and above of said second embodiment of said forward-hinged fuselage-conformal belly-mounted aviation speed brake panel 100.
Figure 25:
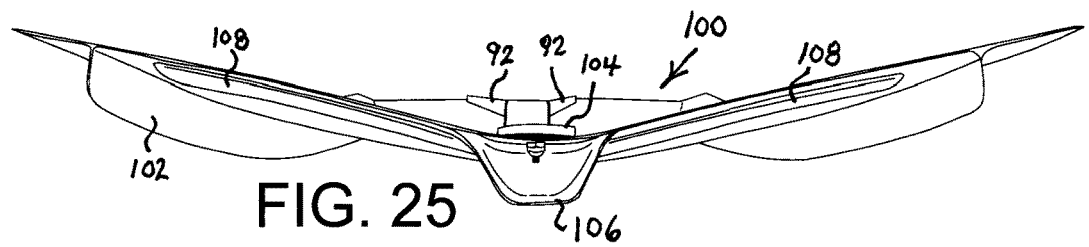
FIG. 25 is a trailing edge view of said second embodiment of said forward-hinged fuselage-conformal belly-mounted aviation speed brake panel 100 showing a pair of spaced parallel aerodynamic strakes 102, a centerline speed brake panel securement magnet 104, a centerline aerodynamic ramp 106 located at an outer rear edge portion of said panel, and a pair of rearward wickerbill ridges 108 bracketing said ramp along said rear edge portion and extending outwardly below the main body of said panel and located between said strakes and respective sides of said ramp.
Figure 26:
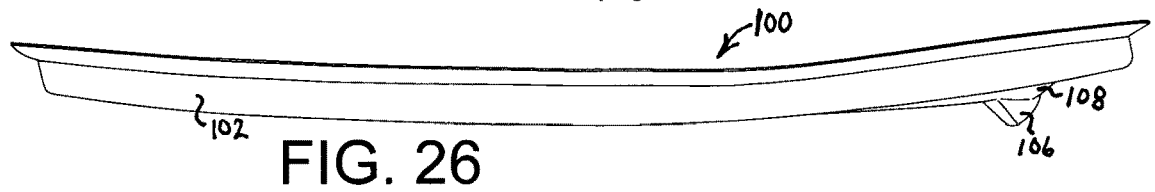
FIG. 26 is a side plan view of said second embodiment of a forward-hinged fuselage-conformal belly-mounted aviation speed brake panel 100 showing one of said strakes and said ramp 106, and one of said wickerbill ridges 108.
Figure 27:
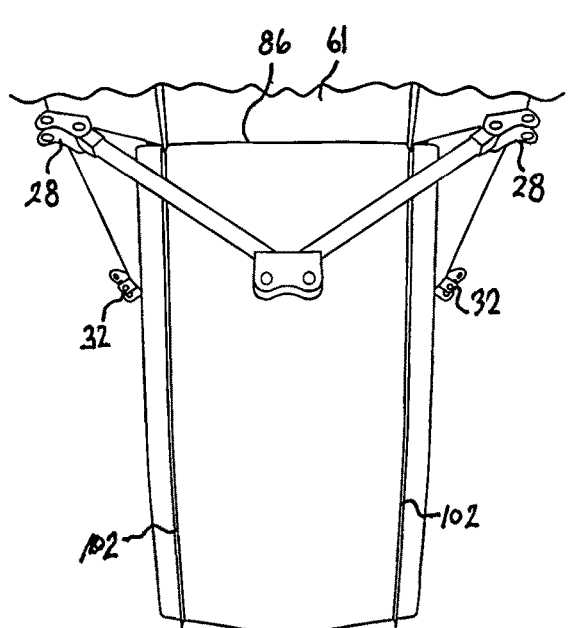
FIG. 27 is a perspective view of said second embodiment of said forward-hinged fuselage-conformal belly-mounted aviation speed brake panel 100 (extended)
Figure 28:
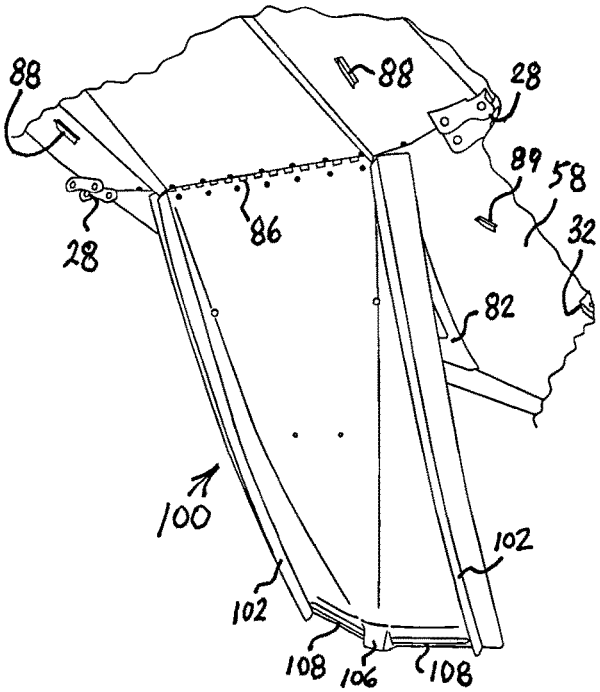
FIG. 28 is another perspective view of said second embodiment of said forward-hinged fuselage-conformal belly-mounted aviation speed brake panel 100 (extended)
Figure 29:
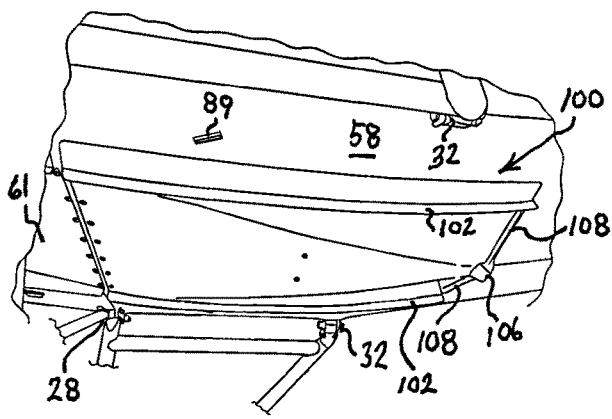
FIG. 29 is a perspective side view of said second embodiment of said forward-hinged fuselage-conformal belly-mounted aviation speed brake panel 100 (retracted)
Figure 30:
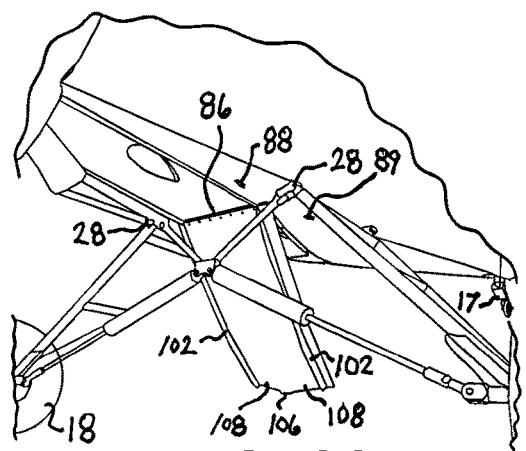
FIG. 30 is another perspective view of said second embodiment of said forward-hinged fuselage-conformal belly-mounted aviation speed brake panel 100 (extended)
Figure 31:
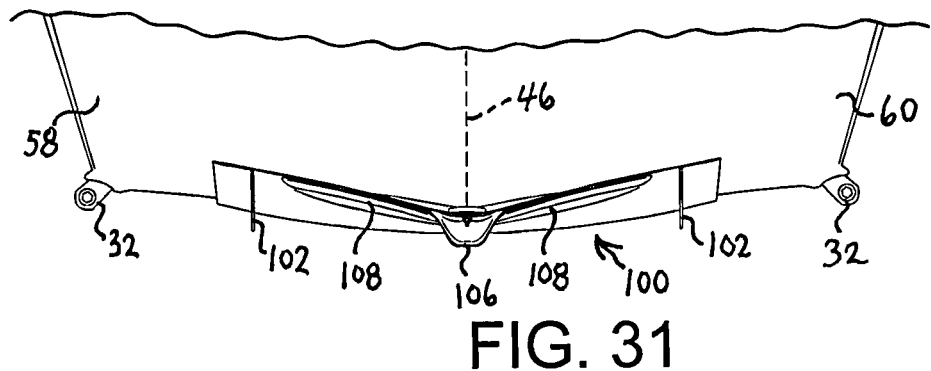
FIG. 31 is a perspective view from the rear and below of said second embodiment of said forward-hinged fuselage-conformal belly-mounted aviation speed brake panel 100 (retracted)
Figure 32:
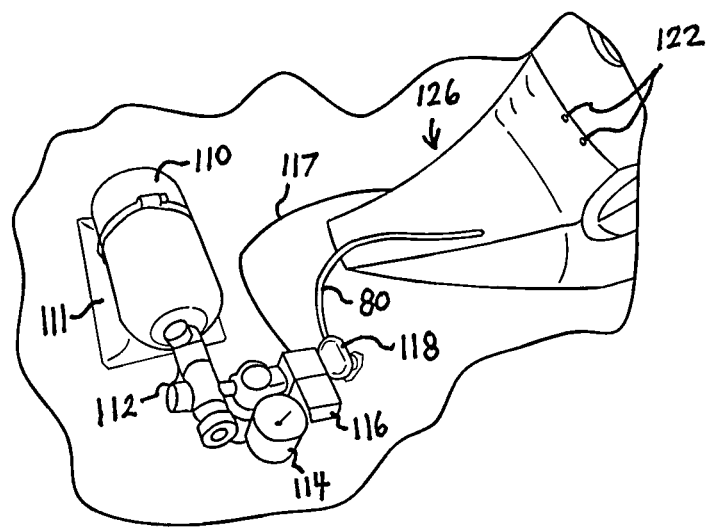
FIG. 32 is a perspective view of a group of several components of the invention comprising a pneumatic actuator charging bottle 110, an actuator charging bottle mounting 111, a high pressure regulator 112, a low pressure regulator 114, an electric over air solenoid air line flow valve 116, a solenoid control wiring 117 having a manually activated control switch (not shown) preferably accessibly attached to a flight control stick for pilot selective activation of said panel extension and retraction (preferably said switch is a push button switch mounted to the control stick that when pressed and held depressed energizes the solenoid air line flow valve to extend said pneumatic actuator to extend said panel and when released de-energizes the flow valve and allows said actuator and said panel to retract), a manual air line flow shutoff valve 118, a charging tube 80 connecting to said actuator 76 (not shown), and a pair of upper panel retracting tension spring anchors 122 attached to a selected portion of the interior of said fuselage (e.g. an interior portion of a hollow pilot seat pedestal 126) above said panel and said anchors operatively attached to respective said panel retracting tension springs 120 and said springs operatively attached to a pair of lower panel retracting tension spring anchors 96.
Figure 33:
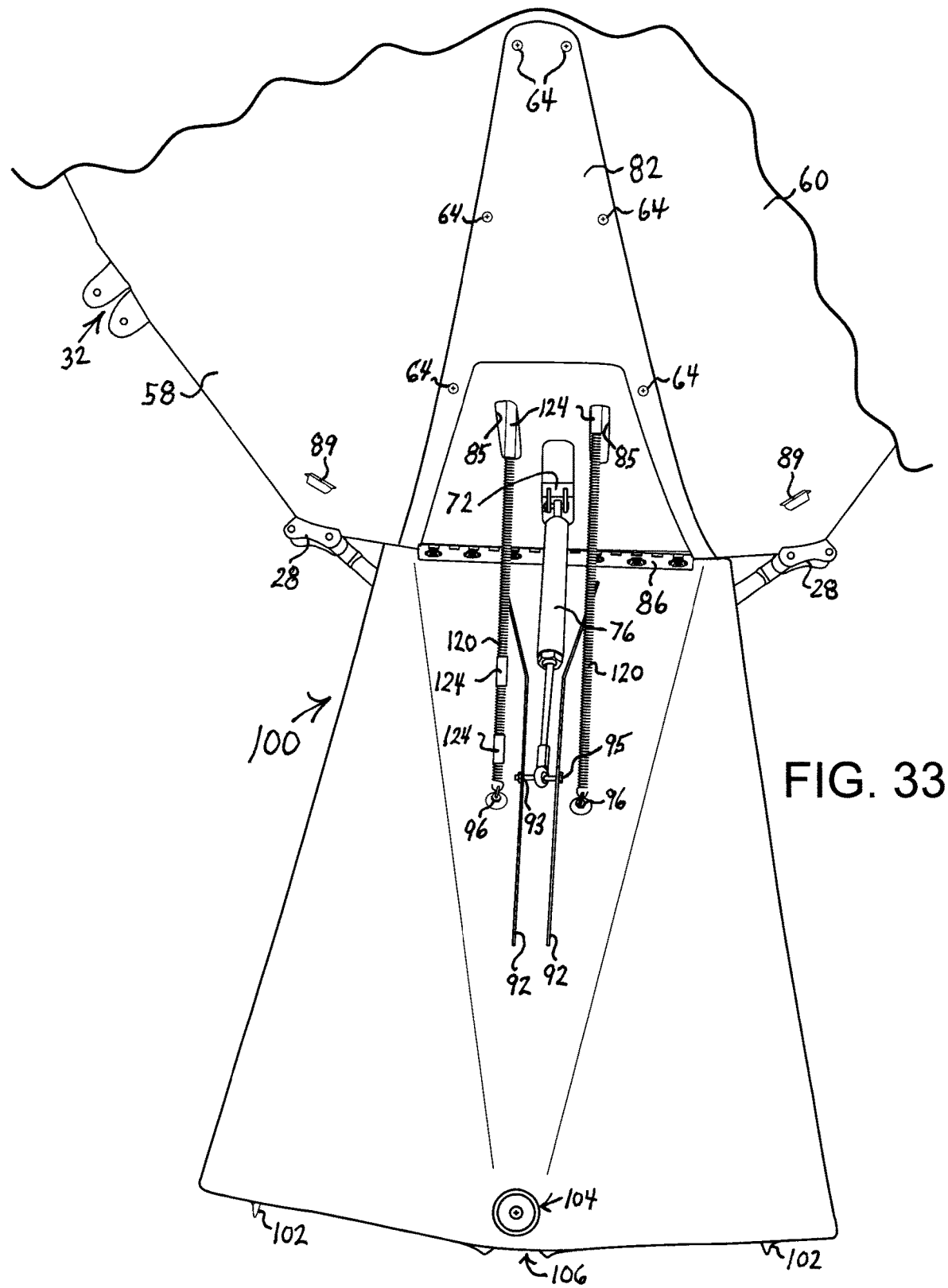
FIG. 33 is a perspective view of said second embodiment of said forward-hinged fuselage-conformal belly-mounted aviation speed brake panel 100 (extended)
Figure 34:
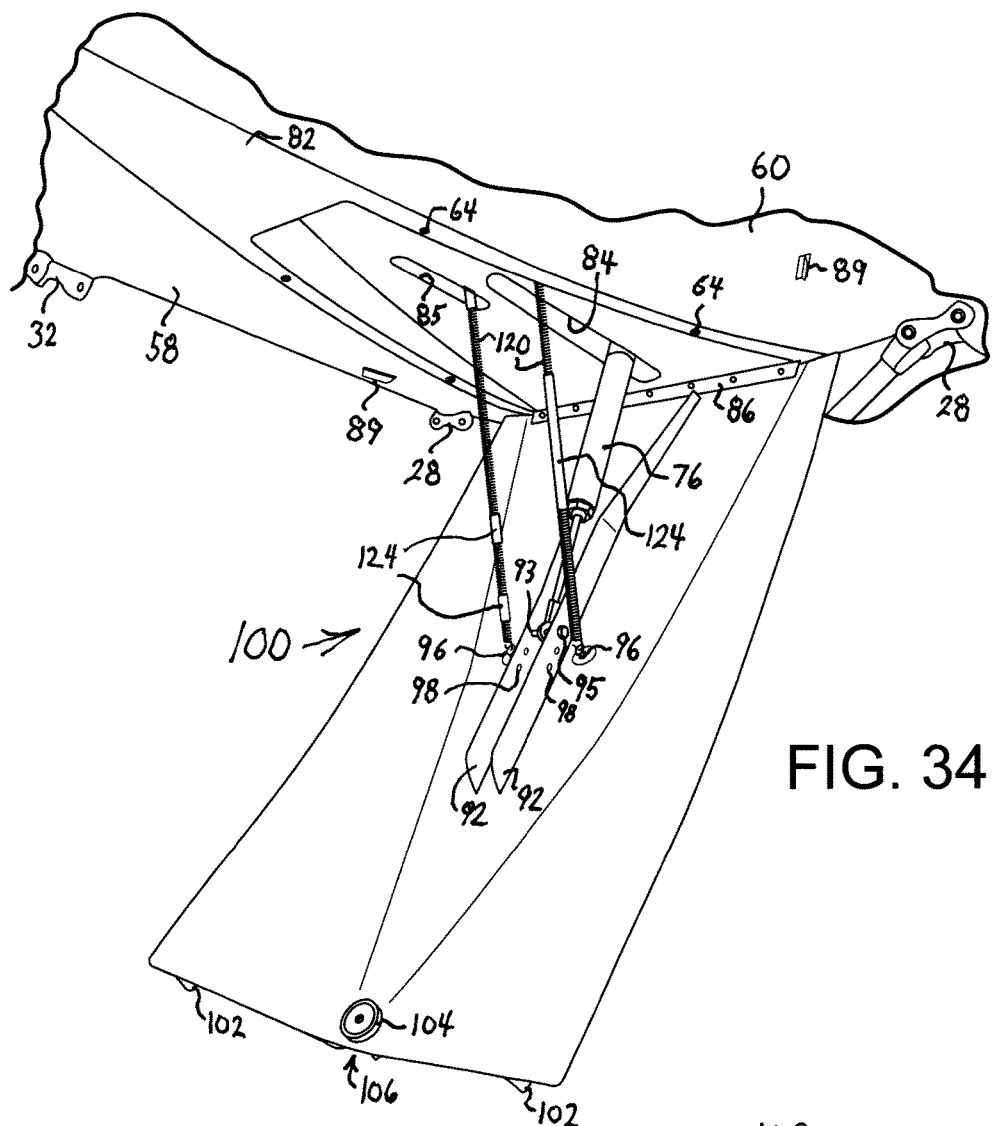
FIG. 34 is a perspective view from the rear and right side and forward of said second embodiment of said forward-hinged fuselage-conformal belly-mounted aviation speed brake panel 100 (extended)
Figure 35:
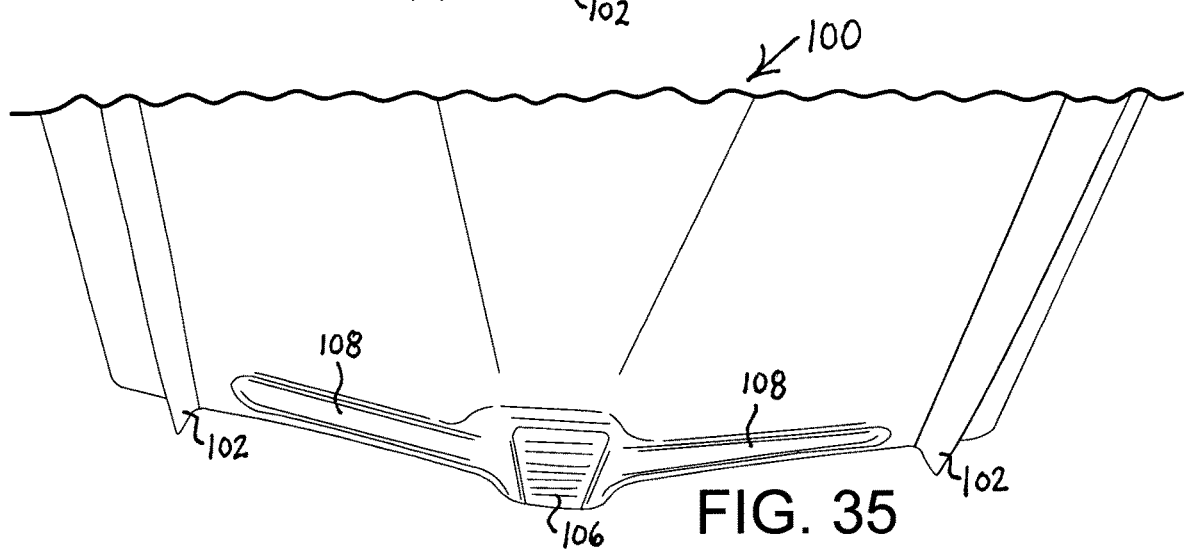
FIG. 35 is a partial, perspective view of an outer trailing edge and rearward outer portion of said forward-hinged fuselage-conformal belly-mounted aviation speed brake panel 100.
Figure 36:
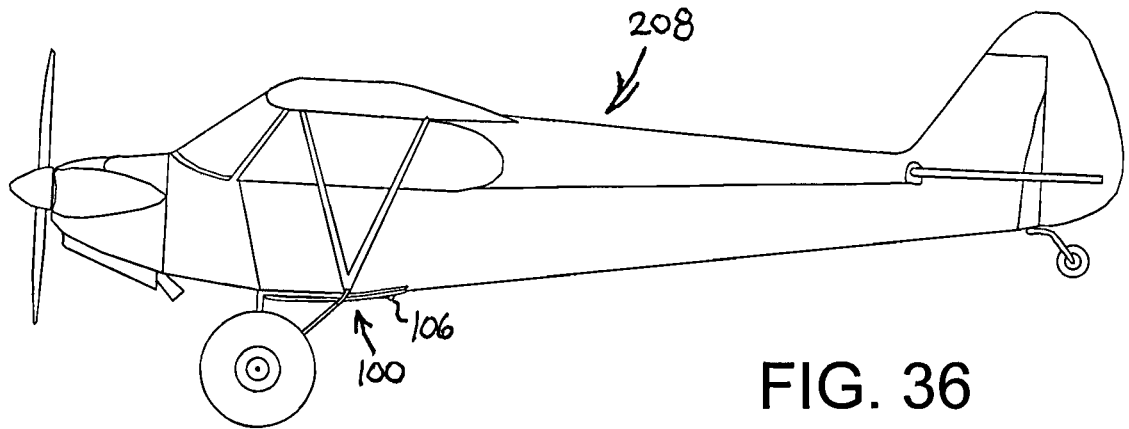
FIG. 36 is a side view of a modified aircraft 208 showing a forward-hinged fuselage-conformal belly-mounted aviation speed brake panel 100 (retracted) mounted to said aircraft.
Figure 37:
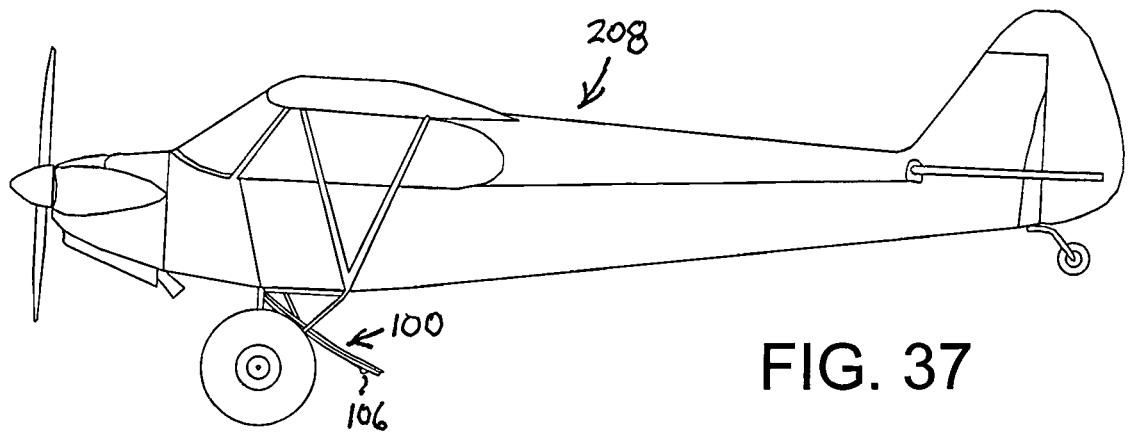
FIG. 37 is a side view of a modified aircraft 208 showing a forward-hinged fuselage-conformal belly-mounted aviation speed brake panel 100 (extended) mounted to said aircraft.
Figure 38:
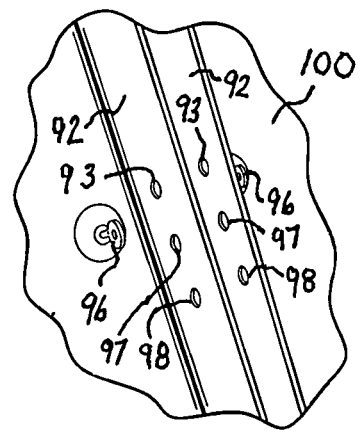
FIG. 38 is a partial, perspective view of an inner portion of said speed brake panel 90, showing said actuator mounting rails 92 having three pairs of actuator mounting apertures 93, 97, 98 among which one said pair before flight can be selectively chosen to operatively receive and retain said actuator retaining bolt 95 that operatively attaches said actuator to said mounting rails.

Preferably the speed brake panel of the invention is primarily fabricated as a multilayer carbon fiber reinforced polymer (CFRP) panel molded to the specific aircraft to be modified. In modifying a prior art aircraft to mount the conformal speed brake panel assembly as disclosed herein, it may be desirable to mold the speed brake panel to the specific aircraft to be modified. Further as shown in FIG. 6, the panel can be molded on the specific prior art aircraft being modified or be molded to conform to the underside contour of the fuselage of a specific model of a preexisting aircraft that exists in multiple copies of the aircraft. FIG. 6 presents an illustrative step in the process of making a mold for subsequent use in forming and making a conformal carbon fiber reinenforced polymer (CFRP) panel of the instant invention showing a carbon fiber reinenforced polymer panel molding process retaining wall 66, one of a plurality of carbon fiber fabric layers 67, and another one of said plurality of carbon fiber fabric layers 68.

The illustrative modified aircraft 208 mounted with the instant speed brake assembly comprises:

a modified lower fuselage frame 70 having a speed brake panel actuator attachment cross tube 72 bridging and attached to a pair of two forward converging diagonal frame tubes 34 and 36 joined at their front ends to said front main cross tube 26;

a pair of actuator mounting ears 74 attached to said attachment cross tube and operatively mounting by use of an actuator retaining pin 75 a speed brake pneumatic actuator 76 having an actuator charging tube quick connector 78 that in turn is connected to a charging tube 80;

an intermediate shielding panel 82 having a longitudinal centerline actuator slot 84 and two spaced longitudinal tension spring slots 85 bracketing said centerline;

a speed brake panel hinge 86 removably attached to a transverse attachment rail 27;

a pair of spaced parallel vortex generators 88 attached to the underside fuselage skins 58, 60 forward of said panel hinge;

a pair of spaced rearward diverging vortex generators 89 (diverging outward and to the rear a selected angle from a range of 30 to 60 degrees from the longitudinal centerline) attached to the underside fuselage skins 58, 60 rearward of said panel hinge;

a first embodiment of a forward-hinged fuselage-conformal belly-mounted aviation speed brake panel 90 operatively attached to said hinge 86;

two spaced speed brake panel pneumatic actuator mounting rails 92 attached to the inner surface of said panel, said actuator mounting rails operatively attached to said pneumatic actuator 76;

a plurality of speed brake panel hinge attachment apertures 94 distributed along and spaced from the leading edge of the panel to cooperate and attach panel through said apertures to said hinge;

a pair of lower panel retracting tension spring anchors 96 attached to the inner surface of said panel;

alternatively a second embodiment of a forward hinged speed brake panel 100 attached to said hinge further having a pair of spaced parallel aerodynamic strakes 102 attached to the outer surface of said panel and a speed brake panel securement magnet 104 attached to a centerline trailing edge inner surface portion of said panel, said magnet to operatively be attracted to said downward bowed rearward converging access panel frame tubes 42, 44 joined at their rear ends;

a centerline aerodynamic ramp 106 located at outer trailing edge of said speed brake panel;

a pair of rearward wickerbill ridges 108 bracketing said ramp along said rear edge portion and extending outwardly below the main body of said panel and located between said respective strakes and respective sides of said ramp;

a pneumatic actuator charging bottle 110 mounted to an actuator charging bottle mounting 111 that is attached to a selected portion of the cockpit floor behind a hollow pilot seat pedestal 126, said bottle operatively connected to a high pressure regulator that in turn is operatively connected to a low pressure regulator 114 that in turn is operatively connected to an electric over air solenoid air line flow valve 116 that is electrically controlled by a solenoid control wiring 117 that is operatively connected to a manually activated control switch (not shown) preferably said control swithch accessibly attached to a flight control stick for pilot selective activation of said speed brake panel extension and retraction (preferably said switch is a push button switch mounted to the control stick that when pressed and held depressed energizes the solenoid air line flow valve to extend the pneumatic actuator that in turn extends the speed brake panel and when released de-energizes the flow valve and allows the actuator and panel to retract);

preferably a manual air line flow shutoff valve 118 is in place between said solenoid air line flow valve and said charging tube 80 that in turn is operatively connected to said actuator; and a pair of panel retracting tension springs 120 operatively attached to a pair of upper panel retracting tension spring anchors 122 that are attached to a selected portion of the interior of said fuselage (for example to an interior portion of said hollow pilot seat pedestal 126) above said panel and said springs operatively attached to said lower panel retracting tension spring anchors 96.

Electively and selectively one or more segments of tension spring nonconducting physical shielding sleeves 124 may operatively receive, retain, dampen spring oscillations, and shield portions of said tension springs.

The following table lists the elements of an aviation speed brake assembly having a fuselage-conformal belly-mounted aviation speed brake panel 90, 100 and having an operable pilot controlled speed brake extending pneumatic actuator 76, and one or more panel retracting tension springs 120 and related elements of a prior art aircraft 8 relevant to the inventive concepts disclosed in this application for effectuating an improved tail dragger short takeoff and landing (STOL) capable aircraft 208 operatively equipped with said speed brake panel 90, 100 (the elements of the aviation speed brake assembly could also be used with an appropriate STOL capable aircraft having a tricycle landing gear):

| # | Elements, an indicia, and an illustrative molding step of a speed brake panel |
|---|---|
| 8 | a prior art experimental tail dragger short takeoff and landing (STOL) capable aircraft 8 (single engine high wing aircraft)(e.g. Carbon Cub EX-2) |
| 10 | a wing 10 |
| 12 | a fuselage 12 |
| 14 | an engine 14 |
| 16 | an empennage 16 |
| 17 | a tail wheel assembly 17 |
| C | an indicia of center of gravity C of prior art aircraft 8 |
| 18 | a main landing gear preferably having two spaced flotation tires 18 |
| 20 | a lower fuselage frame 20 |
| 21 | a lower fuselage longitudinal left main rail 21 |
| 22 | a lower fuselage longitudinal right main rail 22, said longitudinal main rails each joined at their respective front ends to a |
| 23 | a bridging forward cross tube 23 |
| 24 | a pair of two converging rearward diagonal frame tubes 24 joined at their front ends |
| 26 | a bridging front main cross tube 26 attached between said main rails |
| 27 | a transverse speed brake panel hinge attachment rail 27 |
| 28 | a pair of spaced front main cross tube connector fittings 28 |
| 30 | a bridging rear main cross tube 30 attached between said main rails |
| 32 | a pair of spaced front main cross tube connector fittings 32 attached to outer end portions of said front main cross tube |

-continued

| # | Elements, an indicia, and an illustrative molding step of a speed brake panel |
|---|---|
| 34 | a pair of two forward converging diagonal frame tubes 34 and 36 joined at their |
| 36 | front ends to said front main cross tube 26 |
| 38 | an intermediate cross tube 38 bridging and attached between mid-portions of said forward diagonal frame tubes |
| 40 | a battery grounding stud 40 |
| 42 | two downward bowed rearward converging access panel frame tubes 42 and |
| 44 | 44 joined at their front ends to outward portions of said front main cross tube 26 and joined at their rear ends to a |
| 46 | a longitudinal centerline keel stringer tube 46 |
| 48 | two converging rearward diagonal truss tubes 48 and 50 attached respectively |
| 50 | to outer end portions of said intermediate cross tube and attached between said intermediate cross tube and said rear main cross tube 30 and said converging forward diagonal frame tubes 34 and 36, said diagonal truss tubes bracketing about the longitudinal centerline and |
| 52 | a plurality of transverse cross tubes 52 distributed parallel to one another and rearward beyond said rear main cross tube 30 and bridging and attached between said main rails 21 and 22 |
| 54 | a plurality of diagonal cross tubes 54 distributed rearward beyond said rear main cross tube 30 and bridging and attached between said main rails 21 and 22 and preferably between adjacent said transverse cross tubes 52 |
| 56 | an isosceles triangular lower fuselage belly access panel 56 |
| 58 | a lower left fuselage outer skin surface 58 |
| 60 | a lower right fuselage outer skin surface 60 |
| 61 | a boot cowl 61 |
| 62 | a plurality of panel attachment apertures 62 |
| 64 | a plurality of panel and cowl attachment connectors 64 (preferaby threaded) |
| 66 | a CFRP (carbon fiber reinenforced polymer) panel molding process retaining wall 66 |
| 67 | one of a plurality of carbon fiber fabric layers 67 |
| 68 | another one of said plurality of carbon fiber fabric layers 68 |
| 70 | modified lower fuselage frame 70 having |
| 72 | an actuator attachment cross tube 72 |
| 74 | a pair of actuator mounting ears 74 |
| 75 | an actuator retaining pin 75 |
| 76 | a pneumatic actuator 76 |
| 78 | an actuator charging tube quick connector 78 |
| 80 | an actuator charging tube 80 |
| 82 | a shielding panel 82 preferably fabricated as a multilayer CFRP panel |
| 84 | an actuator slot 84 |
| 85 | two spring slots 85 |
| 86 | a speed brake panel hinge 86 |
| 88 | a pair of spaced parallel vortex generators 88 |
| 89 | a pair of spaced rearward diverging vortex generators 89 |
| 90 | a first embodiment of a forward hinged fuselage-conformal belly-mounted aviation speed brake panel 90 |
| 92 | a pair of actuator mounting rails 92 |
| 93 | one or more pairs of actuator mounting apertures 93, 97, 98 |
| 94 | a plurality of panel attachment apertures 94 |
| 95 | an actuator retaining bolt 95 |
| 96 | a pair of lower panel retracting tension spring anchors 96 |
| 100 | a second embodiment of a forward hinged fuselage-conformal belly-mounted aviation speed brake panel 100 |
| 102 | a pair of spaced parallel aerodynamic strakes 102 |
| 104 | a panel securement magnet 104 |
| 106 | a centerline aerodynamic ramp 106 located at outer rear edge of said speed brake panel |
| 108 | a pair of rearward wickerbill ridges 108 located at outer rear edge of said panel bracketing said ramp |
| 110 | a pneumatic actuator charging bottle 110 |
| 111 | an actuator charging bottle mounting 111 |
| 112 | a high pressure regulator 112 |
| 114 | a low pressure regulator 114 |
| 116 | an electric over air solenoid air line flow valve 116 |
| 117 | a solenoid control wiring 117 and a manually activated control switch (not shown) preferably accessibly attached to a flight control stick for pilot selective activation of said speed brake panel extension and retraction (preferably said switch is a push button switch mounted to the control stick that when pressed and held depressed energizes the solenoid air line flow valve to extend the pneumatic actuator to extend the speed brake panel and when released de-energizes the flow valve and allows the actuator and panel to retract) |
| 118 | a manual air line flow shutoff valve 118 |
| 120 | a pair of panel retracting tension springs 120 |
| 122 | a pair of upper panel retracting tension spring anchors 122 attached to a selected portion of the interior of said fuselage (e.g. an interior portion of a hollow pilot seat pedestal 126) above said panel and said anchors operatively attached to respective said retracting tension springs and said springs operatively attached to said lower panel retracting tension spring anchors 96 |

-continued

| #   | Elements, an indicia, and an illustrative molding step of a speed brake panel |
|-----|---|
| 124 | one or more segments of tension spring nonconducting physical tubular shielding sleeves 124 to operatively receive, retain, dampen oscillation, and shield said tension springs |
| 126 | a hollow pilot seat pedestal 126 |
| 208 | an improved tail dragger short takeoff and landing (STOL) capable aircraft 208 operatively equipped with a selected speed brake panel |

The actuator of the invention is powered preferably by a high pressure actuator charging bottle 110. A majority of the structural components of the panel are made from carbon fiber reinforced polymer material or other suitable materials used in aircraft manufacture and by aircraft kit manufacturers.

The preceding description and exposition of a preferred embodiment of the invention is presented for purposes of illustration and enabling disclosure. It is neither intended to be exhaustive nor to limit the invention to the precise form disclosed. Modifications or variations in the invention in light of the above teachings that are obvious to one of ordinary skill in the art are considered within the scope of the invention as determined by the appended claims when interpreted to the breath to which they are fairly, legitimately and equitably entitled.

I claim:

1. An aviation speed brake assembly for an experimental single engine high wing short takeoff and landing (STOL) capable aircraft such as a Carbon Cub EX-2 aircraft or a similar aircraft comprising:
    a forward-hinged fuselage-conformal belly-mounted belly mounted forward-hinged speed brake panel, said speed brake panel operatively and selectively extended by a pneumatic actuator under the selective control of a pilot by means of a control switch connected to a selected pilot accessible upper portion of a flight control stick of said aircraft;
    said speed brake panel is a multilayer carbon fiber reinforced polymer material panel; and one or more panel retracting tension springs operatively attached to one or more upper panel retracting tension spring anchors, said upper panel retracting tension spring anchors attached to one or more selected interior portions of said aircraft above said panel, and said springs operatively attached to one or more lower panel retracting tension spring anchors of said panel;
    said speed brake further comprising a speed brake panel securement magnet attached to a centerline trailing edge inner surface portion of said panel, said magnet to operatively be attracted when said panel is retracted to proximate relative overhead portions of chromoly steel aircraft airframe portions of two access panel frame tubes joined at their rearward ends.

2. The speed brake assembly in accordance with claim 1, further comprising a pair of aerodynamic strakes spaced parallel bracketing the longitudinal centerline of said aircraft and said strakes attached to the outer surface of said speed brake panel.

3. The speed brake assembly in accordance with claim 1, further comprising an aerodynamic ramp attached to a centerline rear trailing edge outer surface portion of said panel.

4. The speed brake assembly in accordance with claim 3 further comprising a pair of rearward wickerbill ridges bracketing said ramp along said rear edge portion and extending outwardly below the main body of said panel and located between said strakes and respective sides of said ramp.

5. An aviation speed brake assembly for mounting to an experimental single engine high wing short takeoff and landing (STOL) capable aircraft such as a Carbon Cub EX-2 aircraft or a similar aircraft, comprising: a forward-hinged fuselage-conformal belly-mounted speed brake panel operatively and selectively extended by a pneumatic actuator under the selective control of a pilot by means of a control switch connected to a selected pilot accessible upper portion of a flight control stick of said aircraft;
    said speed brake panel is a multilayer carbon fiber reinforced polymer material panel;
    one or more panel retracting tension springs operatively attached to one or more upper panel retracting tension spring anchors that are attached to one or more selected portions of the interior of said aircraft above said panel, and said springs operatively attached to one or more lower panel retracting tension spring anchors of said panel;
    a pair of aerodynamic strakes spaced parallel bracketing the longitudinal centerline of said aircraft, and said strakes attached to the outer surface of said panel; and
    a speed brake panel securement magnet attached to a centerline trailing edge inner surface portion of said panel, said magnet to operatively be attracted when said panel is retracted to proximate relative overhead portions of chromoly steel aircraft airframe portions of two access panel frame tubes joined at their rearward ends.

6. The speed brake assembly in accordance with claim 5, further comprising an aerodynamic ramp attached to a centerline rear trailing edge outer surface portion of said panel.

7. The speed brake assembly in accordance with claim 6, further comprising a pair of rearward wickerbill ridges bracketing said ramp along said rear edge portion and extending outwardly below the main body of said panel and located between said strakes and respective sides of said ramp.

* * * * *